Feb. 17, 1970  J. L. HARPER  3,496,324
METHOD OF BRAZING ALUMINUM
Filed Nov. 13, 1967

WITNESSES
Theodore F. Wrobel
James F. Young

INVENTORS
John L. Harper
BY John L. Stoughton
ATTORNEY

United States Patent Office 3,496,324
Patented Feb. 17, 1970

3,496,324
METHOD OF BRAZING ALUMINUM
John L. Harper, West Middlesex, Pa., assignor to Westinghouse Electric Corporation, Pittsburgh, Pa., a corporation of Pennsylvania
Filed Nov. 13, 1967, Ser. No. 682,390
Int. Cl. B23k 1/02, 1/04, 11/18
U.S. Cl. 219—85       5 Claims

ABSTRACT OF THE DISCLOSURE

This application discloses a method of incandescent brazing of aluminum which utilizes a non-conducting brazing flux. This method includes the step of providing the metallic brazing alloy with projections which extend through the non-conducting flux and engage the parts to be brazed to provide initial current conducting paths through the brazing flux. After the flux melts, current will flow thereafter wherever there is metal-to-metal contact.

---

In the prior art, TIG and MIG welding are the usual methods employed to joint aluminum-to-aluminum. These are difficult procedures and a long instruction time is usually required to qualify an operator for performing these methods. Even with qualified operators, it is difficult to obtain a TIG or MIG weldment to carry a designed current loading. Not only is the result not always attained, but TIG and MIG welding are costly because of the operator time and the use of the relatively expensive gases such as argon and helium.

In the prior art copper-to-copper elements have been brazed together by a process known as an incandescent carbon brazing. In the performance of this process, no flux is required; however, a metallic sheet of self-fluxing material is placed between the surfaces to be brazed. Thereafter carbon blocks are seated against the outer surfaces of the copper elements adjacent the location of the braze and current is caused to flow between the outer surfaces of the carbon blocks through the copper elements and the metallic brazing alloy. The flow of current to a small extent directly heats the members through which it flows and to a greater extent heats the carbon blocks. The heat generated in the carbon is conducted through the copper members in sufficient quantities to melt the metallic brazing alloy whereby the capper pieces are brazed together.

This method cannot be used for brazing aluminum-to-aluminum pieces because the flux which must be used to brace aluminum is non-conductive and no electrical current path would exist between the carbon blocks. In accordance with this invention, the metallic brazing agent or alloy is provided with small cross-sectional area projections extending out beyond its opposite faces whereby the projections will pierce the two fluxed surfaces and engage the aluminum to thereby provide a path for the heating current. The small area projections heat rapidly and the flux melts whereby metal-to-metal contact areas are established. Once these metal-to-metal contact areas are established, heating current for the carbon blocks flows and the parts are heated sufficiently for them to be brazed together.

An object of this invention is to provide a method for incandescent brazing aluminum parts together.

A further object of this invention is to provide a method to braze parts with a non-conducting flux.

Other objects of this invention will be apparent from the descriptions, the hereinafter appended claims and the drawings in which:

Figure 1:
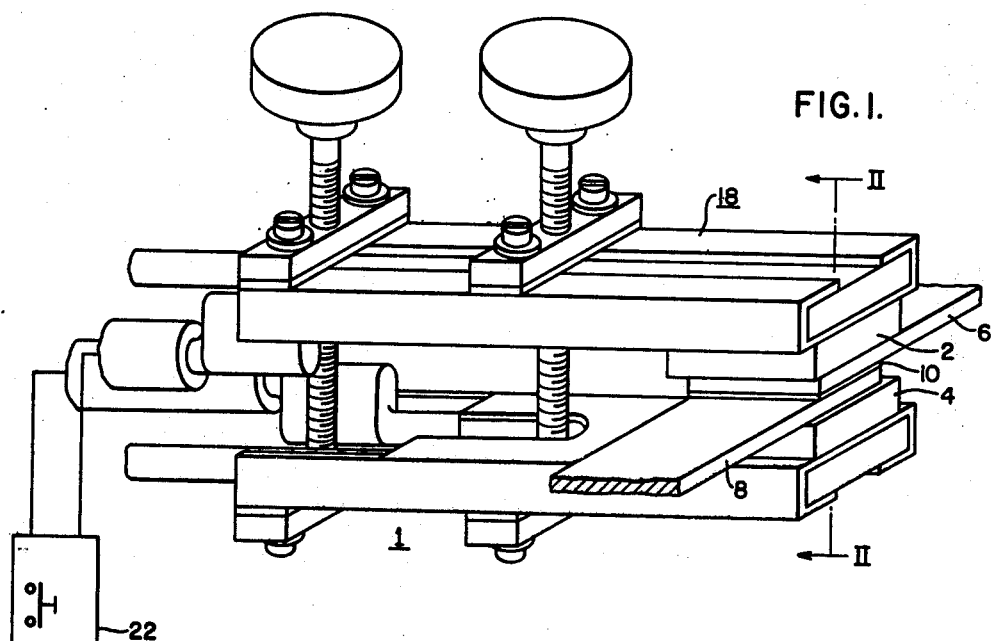
FIGURE 1 illustrates an apparatus which may be utilized for the incandescent brazing of aluminum parts.
Figure 2:
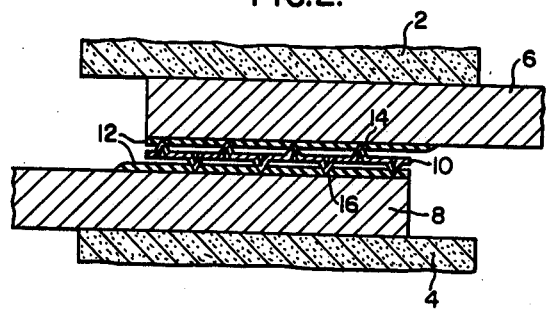
FIG. 2 is an enlarged partial view taken substantially along the line 2—2 of FIG. 1 and looking in the direction of the arrows.
Figure 3:
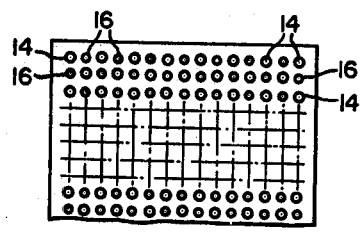
FIG. 3 is an enlarged view of a piece of brazing alloy fabricated in accordance with the teachings of this invention.

Referring to the drawings by characters of reference, the numeral 1 designates generally an incandescent brazing apparatus which comprises first and second carbon heating elements or pads 2 and 4 which seat against outer surfaces of a pair of aluminum members 6 and 8 which are to be joined together. A sheet of brazing alloy 10 is located between the adjacent surfaces of the aluminum members 6 and 8 which are coated with a suitable brazing flux 12 which in this case is non-conducting. The brazing alloy 10 has oppositely extending projections 14 and 16 which extend through the brazing flux 12 and engage the adjacent surfaces of the aluminum members 6 and 8. A suitable clamping device 18 clamps the carbon heating elements 2 and 4 tightly against the outer surfaces of the two aluminum members 6 and 8. Brazing heating current from a suitable source of supply is supplied through the conductors 20 which connect with the outer surfaces of the carbon heating elements 12 and 14 as indicated. A suitable switch 22 manually or automatically operated may be provided to regulate the length of time that the carbon heating elements are energized.

In one form of the invention the brazing alloy may be .003 inch thick and 2 inches wide and pierced from both sides to produce sharp projections extending outwardly from both faces of the strip a distance of approximately .030 inch. The projections may be on ⅛ inch centers and alternate between the sides of the strip. Thus the projections on any one side of the strip would be on ¼ inch centers. The brazing alloy used is sold in the market by Aluminum Company of America under the designation 718 and the flux was also sold by Aluminum Company of America under the designation Alcoa flux No. 33.

In brazing, current flows between the carbon heating elements through the aluminum members 8 and 10 and the projections 14 and 16 of the brazing alloy 10. The current flow heats the projections and the brazing flux 12 melts. When this occurs, the aluminum members 6 and 8 move under the force of the device 18 and seat against the brazing alloy 10. The current continues to flow through the carbon elements and the aluminum members 6 and 8 due to the now existing metal-to-metal contact of members 6, 8 and 10. The heat thus generated causes the carbon heating elements 2 and 4 to become incandescent whereby their contacting surfaces heat the adjacent portions of the aluminum members 6 and 8. The total heat provided by the carbon elements 2 and 4 and the current flowing through the aluminum members and the brazing alloy is sufficient to melt the brazing alloy whereby, when current is interrupted, the aluminum members 6 and 8 will be brazed together.

Various modifications may be made within the spirit of the invention.

What is claimed and is desired to be secured by United States Letters Patent is as follows:

1. The method of joining a first surface of a first aluminum member to a first surface of a second aluminum member by a quantity of brazing material having first and second surfaces with each of said brazing material surfaces having first and second spaced portions by the use of a non-conducting fluxing agent which comprises the steps of sandwiching said brazing material between said surfaces of said members with said spaced first portions of said brazing material separated from the respective adjacent said first surfaces of said members by first and second portions of said non-conducting fluxing agent and with said spaced second portions of said brazing material extending through said portions of said fluxing agent and contacting said respective adjacent said first surfaces to provide initial current conducting paths between said first surfaces, of placing electrically energizable heat producing elements against second surfaces of said members, of energizing said elements with an electric potential which causes a flow of heating current between said members and through said brazing material, said current being of sufficient magnitude to melt said fluxing agent and said brazing material and of thereafter terminating said flow of heating current whereby said brazing material can solidify and join said members together.

2. Th method of claim 1 in which said second portions of said brazing material comprise first and second sets of spaced projections extending outwardly in opposite directions from said material.

3. The method of claim 2 in which the brazing material is in sheet form with said first set of projections extending outwardly from one side of said brazing material and with said second set of projections extending outwardly from the opposite side of said brazing material, said first set of projections being staggered with respect to said second set of projections.

4. The method of joining together a pair of aluminum members which comprises the steps of coating, with a fluxing agent, a first surface portion of each of a pair of members which are to be brazed together, of placing one surface of a sheet of brazing agent on the coated surface portion of one of said pair of members with a plurality of portions of said brazing agent projecting through the adjacent fluxing agent and against said surface portion of said one member, of placing the coated surface portion of the other of said pair of members on the other surface of said brazing agent with a plurality of portions of said brazing agent projecting through the adjacent fluxing agent and against said surface portion of said other member, and of applying electrically energizable heaters to the surfaces of said members opposite to their first portions, and of energizing said heaters with an electrical circuit, which passes between said heaters through said members and said brazing agent, for a period of time sufficient to melt said brazing agent, and of thereafter deenergizing said heaters.

5. The method of claim 4 in which said heaters are of a high carbon content and have first and second spaced surface portions, said step of applying said heaters comprising the placing of said heaters with first surface portions in face-to-face relation with said members, and said step of energization comprising the passage of current through said heaters between their first and their second said spaced surface portions.

References Cited

UNITED STATES PATENTS

| | | | |
|---|---|---|---|
| 2,480,351 | 8/1949 | Anderson | 219—85 |
| 2,534,643 | 12/1950 | Warner | 219—85 |

OTHER REFERENCES

Wensley, "Electro-Brazing Methods," The Welding Journal, October 1940.

Huff, "Torch Brazing Aluminum," The Welding Engineer, May 1947.

JOSEPH V. TRUHE, Primary Examiner

L. A. ECHUTZMAN, Assistant Examiner

U.S. Cl. X.R.

29—484; 219—93, 117